United States Patent
Miro

[11] Patent Number: 6,132,827
[45] Date of Patent: Oct. 17, 2000

[54] TACKY STRETCH FILM AND METHOD OF MAKING AND USING THE SAME

[75] Inventor: Sergey Miro, Fair Lawn, N.J.

[73] Assignee: AEP Industries, Inc., South Hackensack, N.J.

[21] Appl. No.: 09/081,305

[22] Filed: May 19, 1998

Related U.S. Application Data

[60] Provisional application No. 60/047,057, May 19, 1997.

[51] Int. Cl.$^7$ .................................................. B32B 27/32
[52] U.S. Cl. ...................... 428/35.9; 428/515; 428/516; 428/517; 428/519; 428/521
[58] Field of Search ................. 428/35.7, 35.9, 428/36.6, 36.7, 519, 516, 517, 515, 521, 34.9, 35.2, 69, 76, 908.8; 383/109, 113, 116

[56] References Cited

U.S. PATENT DOCUMENTS

| | | | |
|---|---|---|---|
| 3,294,577 | 12/1966 | Mayer | 117/138.8 |
| 4,082,877 | 4/1978 | Shadle | 428/35 |
| 4,113,804 | 9/1978 | Cotten et al. | 260/897 |
| 4,147,827 | 4/1979 | Breidt et al. | 428/218 |
| 4,194,039 | 3/1980 | Mueller | 428/213 |
| 4,196,240 | 4/1980 | Lustig et al. | 428/35 |
| 4,197,150 | 4/1980 | Breidt et al. | 156/229 |
| 4,222,913 | 9/1980 | Cooper | 260/23 AR |
| 4,311,808 | 1/1982 | Su | 525/222 |
| 4,367,256 | 1/1983 | Biel | 428/218 |
| 4,399,173 | 8/1983 | Anthony et al. | 428/35 |
| 4,399,180 | 8/1983 | Briggs et al. | 428/212 |
| 4,436,788 | 3/1984 | Cooper | 428/483 |
| 4,518,654 | 5/1985 | Eichbauer et al. | 428/331 |
| 4,833,017 | 5/1989 | Benoit | 428/323 |
| 5,019,315 | 5/1991 | Wilson | 264/171 |
| 5,139,700 | 8/1992 | Miksie et al. | 252/389.57 |
| 5,273,809 | 12/1993 | Simmons | 428/212 |
| 5,419,934 | 5/1995 | Wilson | 428/34.9 |
| 5,422,187 | 6/1995 | Miksie et al. | 428/54.9 |
| 5,889,102 | 3/1999 | Haack | 524/494 |

OTHER PUBLICATIONS

Plastics Applications Series: Plastics Film Technology, 1969, edited by W.R.R. Park, Films Research Laboratory, The Dow Chemical Company, Midland, Michigan.

*Primary Examiner*—Ellis Robinson
*Assistant Examiner*—John S. Figueroa
*Attorney, Agent, or Firm*—Mathews, Collins, Shepherd & Gould, P.A.

[57] ABSTRACT

A multilayer industrial stretch film is provided with at least one cling layer and is formed by coextruding a film-formable polymer with a tackifier. The invention provides a multilayer film having at least two skin layers and at least one core layer in which at least one of the skin layers is derived from a mixture of the tackifier and the film-formable polymer. At least one of the core layers can include a vapor corrosion inhibitor (VCI). Beneficial results are obtained by also including a lubricating composition in at least one, if not both, skin layers when at least one of the core layers contains a VCI. The lubricant in the skin layer effectively reduces the extrusion temperature (for blown and cast films), and tends to avoid degrading or igniting the VCI.

38 Claims, 6 Drawing Sheets

TACKY STRETCH FILM AND METHOD OF MAKING AND USING THE SAME

This application claims the benefit of U.S. Provisional application Ser. No. 60/047,057 entitled Tacky Stretch Film With Barrier and Corrosion Inhibiting Properties and Method of Making and Using The Same filed on May 19, 1997 hereby incorporated by reference into this application.

BACKGROUND OF THE INVENTION

1. Field of the Invention

This invention relates to stretch films having particular use as to overwrap films designed for wrapping large objects, to structures and compositions for such films, to methods for making such films, and to methods of using such films, and most particularly to such films having at least one cling (tacky) surface.

2. Description of the Related Art

In general, overwrap films have been used for packaging various types of goods, from retail foods and cigarettes to carpets and furniture. Industrial overwrap films are primarily designed for wrapping loaded shipping pallets and large articles such as furniture, carpets, books, and the like.

Industrial overwrap films typically are provided as one of two types, which types are either stretched around or shrunk over the object packaged. A stretch overwrap film is used by being stretched around the object and then adhered to itself; the tendency of the film to resist further stretching provides a load containment force. For using overwrap shrink film, the film is wrapped around the object and then shrunk, typically by heating, to provide a load of containment force.

Industrial overwrap films are typically based on a single layer or multilayer film comprising ethylene homopolymer or a copolymer of ethylene. Because of the relative largeness and/or heaviness of the wrapped items, these industrial films require a certain degree of toughness, as well as significant resistance to puncture and tearing. These industrial films should also exhibit dimensional stability: once the article is wrapped, the overwrap film should neither stretch, which would allow the wrapped articles to shift and possibly escape the wrapping, nor shrink, which could damage the wrapped article.

Shrink overwrap films are typically biaxially oriented at an elevated temperature and then cooled in a biaxially stretched state. Shrinkage of the film is promoted upon reheating to the elevated orientation temperature. The shrink overwrap film and overwrap heating apparatus are designed to provide a desired degree of shrinkage during reheating of the film. Accordingly, reheating the film causes shrinkage, so that the shrinking film encases the wrapped articles. The degree of shrinkage of such shrink overwrap films must be controlled to avoid damaging the wrapped articles due the film's shrinkage force.

An additional intended property of typical overwrap films, of both the stretch and shrink types, is adhesion of the film to itself and/or to the article being wrapped. Generally, the lower the density of the polyethylene, the tackier or stickier the material. Thus, one method for adhering the film is by self-adhesion, where one surface of the film is tacky and is wrapped onto and adhered to itself. Another method of adhering the film to itself, especially suitable for shrink films, is by overlapping ends of the film and heat-sealing, effectively melting the overlapped portions to each other, and cooling to create a weld.

Overwrap films are often designed to have properties dependent upon the particular customer or end-user. To achieve these properties, the film may be coated with an adjuvant to create a sticky outer layer or a slippery outer layer. A different method of altering the various surface properties of the film is to create a multilayer film wherein a core layer, having properties desired for the internal structure of the film, is sandwiched between skin layers, having the desired properties for the exterior of the film. One of the problems with these multilayer structures is compatibility of the various layers, which can impair the integrity if the unitary multilayer structure. To avoid separation or delamination of the layers, multifarious approaches, including adhesives and bi-adherent (tie) layers between the various structure layers, can be used to keep the structural layers of the multilayer film together as an integral film.

One of the more important active properties of certain films is the inhibition of corrosion, mainly oxidation, of the packed item(s) by gases sealed in with the item(s) packed and /or by diffusion through the film; of course, there is also the common occurrence of insults (pokes and tears) in the film after the item is packed (e.g., during handling and/or transportation). The most common "corrosive" gases found are oxygen and water vapor. Water is a universal solvent and causes or catalyzes oxidation of most metal and other surfaces (with respect to the bulk material, a surface generally has broken bonds available for oxidation). For example, when an item having exposed metal surfaces is wrapped in a stretch film, water vapor trapped in the wrapping, or entering through a tear, or concentrated due to a fall in the environmental temperature (e.g., water vapor having condensed on a wrapped item stored on a cold loading dock) will start to degrade the exposed metal surfaces. This degradation is typically referred to as "vapor corrosion" and products and compositions for its prevention are typically called "vapor corrosion inhibitors" or "VCIs" in the industry. VCI technology include hygroscopic compounds applied to and/or devices sealed in with the items, as well as certain types of films and tapes having hygroscopic and/or protective compounds that are emitted from the film or tape. For example, VCI products such as a protective spray, a plastic and a foam emitter, an impregnated foam tape, a high density polyethylene (HDPE) film, a linear low density stretch film, coated papers, breathable pouches, and the like; such are also described in U.S. Pat. No. 5,422,187 (and those of related applications, such as U.S. Pat No. 5,139,700, to Cortec, St. Paul. Minn., the disclosures of which are all incorporated herein by reference).

In spite of the foregoing, there remains a need for stretch wrapping films having improved properties; namely, improved stretch levels, puncture resistance, tensile strength, tear strength, a higher holding force, and desired cling properties. In addition, there are significant problems incorporating both a VCI and a tackifier into the same film. One problem is that tackifiers are typically viscous liquid concentrates that are added to the melt composition before extrusion, and as such are messy and difficult to handle. Another problem is that the VCI can block the migration of the tackifier to the surface, thus effectively reducing the cling properties of the film. Also, it is desirable to process certain VCIs at relatively low extrusion temperatures, such as below 400° F., preferably below about 370° F., to avoid degrading the VCI composition.

SUMMARY OF THE INVENTION

The present invention provides stretch wrapping films which are tacky or have cling on at least one side, and most especially where such films are produced by extrusion, either by casting or by blowing, the latter which is preferred for the present application. The present invention provides an improved stretch wrapping film which is economically feasible to use and which provides the desired, if not improved, properties necessary for a commercially suitable industrial stretch wrap film. A vapor corrosion inhibitor (VCI) can be incorporated into an extruded stretch film of the present invention without degrading the properties of the film or any additives therein to provide improved vapor corrosion inhibiting properties. Also, the film of the present invention can include a processing lubricant that is suitable for the use with VCIs and/or with tackifiers and that does not adversely effect the desired properties of the VCI and/or tackifier.

Briefly described, the present invention relates to a multilayer film having at least one core layer and two opposing skin layers, in which at least one of the skin layers comprises a tackifier. The tackifier can be a liquid tackifier or solid tackifier or a mixture thereof. For example, the tackifier can be polyisobutylene, low molecular weight polypropylene and other polyolefins. It will be appreciated that other conventional tackifiers known in the art can be used in accordance with the teachings of the present invention. In other embodiments, one or both of the skin layers can be tacky, rendered such by the addition of the tackifier during extrusion. The core layer can include the VCI.

The present invention also relates to a multilayer film produced by a process which comprises (a) providing a first and a second film-formable, ethylene-based, polymeric composition, (b) admixing with and dispersing within the first film-formable composition a tackifier to produce a tacky composition, (c) admixing with and dispersing within the second film-formable composition a vapor corrosion inhibiting composition to produce a corrosion inhibiting composition, and (d) co-extruding into a multilayer film the tacky composition as a skin layer and said corrosion inhibiting composition as another layer, preferably a core layer, of the film to produce a multilayer film. In related embodiments, the tacky composition is extruded as both skin layers and the corrosion inhibiting composition is extruded as a core layer.

In another embodiment, this invention provides a process of producing a multilayer film, which process comprises the steps of (a) providing a first and a second film-formable, ethylene-based, polymeric composition, (b) admixing with and dispersing within the first film-formable compositions a tackifier to produce a tacky layer composition, (c) admixing with and dispersing within the second film-formable composition a vapor corrosion inhibiting composition to produce a corrosion inhibiting composition, and (d) co-extruding into a multilayer film the tacky composition as a skin layer and said corrosion inhibiting composition as another layer of the film. In related embodiments, the process further independently comprises extruding the compositions at a temperature in the range of 365–430° F., preferably not more than about 380° F. when a processing aid or lubricant is used, and most preferably at not more than about 350° F.; the lubricating processing aid is preferably admixed with a composition extruded as at least one of the skin layers.

DETAILED DESCRIPTION OF THE PRESENT INVENTION

Figure 1A:
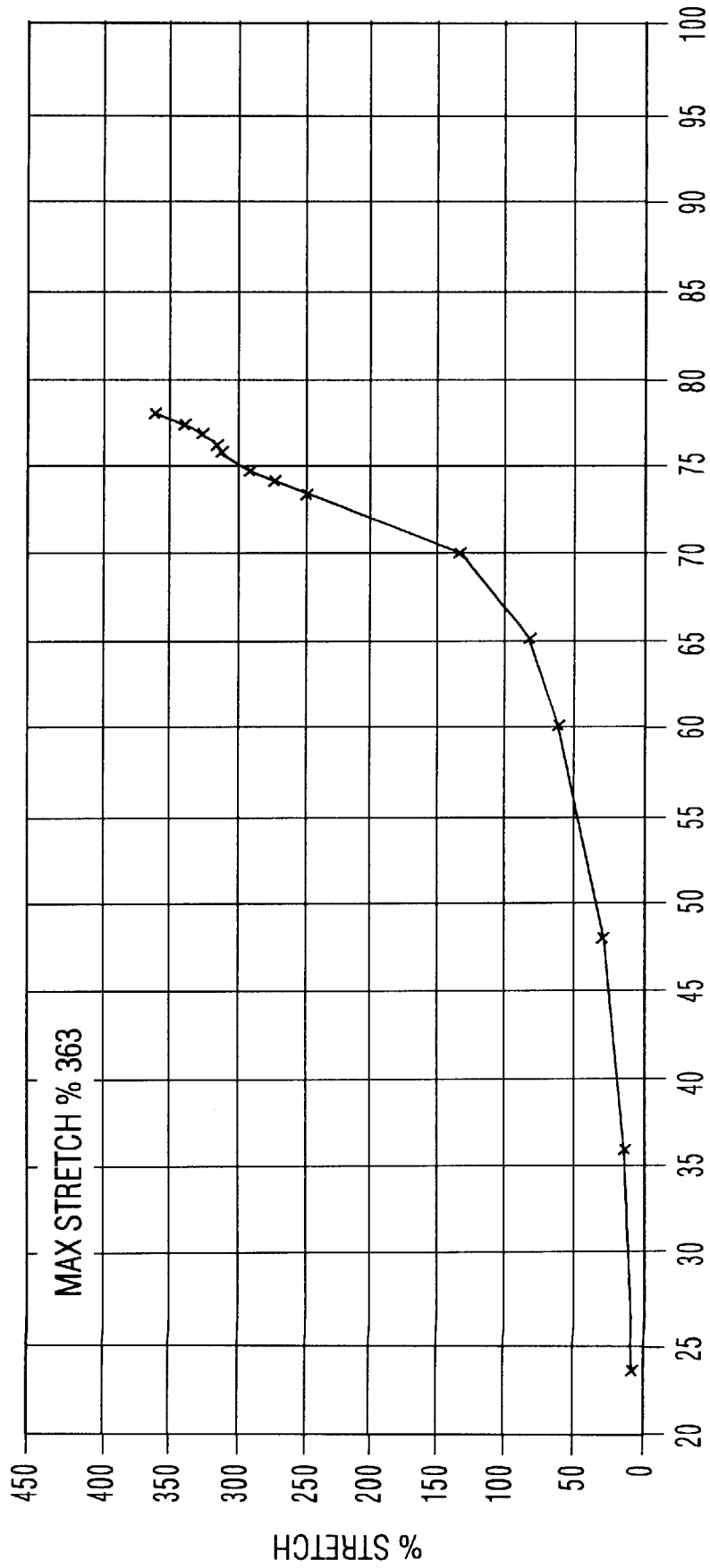
FIGS. 1A and 1B depict physical properties of certain films as described herein.

The invention is especially directed to industrial stretch films, especially those produced by extrusion, preferably by blowing, although the films can also be cast. The films of this invention preferably comprise two skin or outer layers and at least one core or inner layer with at least one of the skin layers being tacky. The film can also possess corrosion inhibiting properties.

At least one, and preferably both, of the skin layers comprises a film formable, ethylene-based polymer, preferably in the form a copolymer of ethylene and at least one higher α-olefin monomer, particularly, linear low density polyethylene (LLDPE). Suitable higher α-olefin monomers are selected from the group consisting of $C_4$–$C_{12}$ α-olefins, including both straight and branched chain α-olefins (e.g., 4-methylpentene-1), and mixtures thereof, and preferably even numbered $C_4$–$C_8$ α-olefins. LLDPEs are ethylene-based copolymers generally having a density between about 0.89 and about 0.926; preferred for this invention are those derived from copolymerization of ethylene with butene (LLDPE-Butene), hexene (LLDPE-hexene), and octene (LLDPE-octene) or any α-olefin with butene, hexene or octene. Each skin layer may comprise a compatible mixture or blend of an LLDPE with another polymer, preferably also an ethylene-based copolymer, but any compatible polymer (or one which can be rendered compatible by the addition of a compatibilizing adjuvant) is suitable. The skin layers together preferably comprise at least 10% of the film (e.g., each preferably comprises at least 5%), more preferably about 10–50%, even more preferably about 20–45%, and most preferably about 30–40% of the film. (Unless otherwise noted, all percentages are weight percentages having the film of the particular layer as the basis, depending upon context). When ethylene homopolymer is used, it can be used in such forms as a low density polyethylene (LDPE), medium density polyethylene (MDPE) or a high density polyethylene (HDPE). LDPE generally having a density of greater than about 0.904 and less than about 0.930. MDPE generally have a density between about 0.930 and about 0.940. HDPE generally having a density greater than about 0.940.

The novel films also contain at least one core layer, and can include at least two core layers of the same or different compositions than each other, and different from the skin layers. As used herein, a layer of the film internal to a skin layer is a core layer; when the film contains multiple core layers, reference can be made to "intermediate" layers as structurally disposed between the skin and another core layer.

All the layers, both skin and core, preferably comprise a portion of polymerized or copolymerized ethylene monomer of at least about 25% to about 100% which can be referred to as a major portion.

At least one of the core layers, or intermediate layers can comprise a film-formable polymer having at least 25%, more preferably at least 50%, even more preferably 60%±40%, even more preferably 70%±25%, and most preferably 80%±15% polymerized propylene monomer; a film-formable propylene-based homopolymer or copolymer can be used. Copolymers of propylene with ethylene and/or with higher α-olefin monomers (as defined above) are also suitable, as are compatible mixtures, blends, and alloys of propylene homo- or copolymers with other compatible polyolefins. Based on the film as a whole (e.g., a cross-section of the entire composition including all of the layers present), preferably at least 10% is comprised of propylene units, more preferably at least about 15%, most preferably in the form of propylene homopolymer. The maximum preferable amount of polypropylene (or propylene units if a copolymer) in the film as a whole is about 65%, more preferably not more than about 25%.

It should be understood that "copolymer" as used herein includes two or more different monomers, as well as film-formable polymers having reactive pendant groups (e.g., acids and salts thereof; thus, olefin copolymers suitable for use in this invention include copolymers of ethylene and $C_4$–$C_8$ α- olefin; ethylene and acrylic acid, methacrylic acid, and/or vinyl acrylate; ethylene and vinyl acetate; and include the salts thereof (i.e., what is typically called an ionomer) to the extent such composition is capable of being formed into a film and is compatible with the immediately adjacent layer(s) of the film.

The novel films of this invention include at least one and may include at least three physically distinct core layers. Each core or intermediate layer can be derived from multiple simultaneously extruded layers of the same composition which bond to create a single layer having a unitary composition. Films of compositions as described in copending application Ser. No. 591, 168, filed Jan. 16, 1996 (the disclosure of which is incorporated herein by reference in its entirety) are suitable for modification with the present invention.

As mentioned above, it is preferable to provide a film wherein at least one of the skin layers is tacky, or both of the skin layers are tacky. For example, customers very often desire to have their articles wrapped in a film having a tacky interior. In such a film, one of the skin layers (that which will be facing the articles wrapped) is provided as a tacky composition and the other skin layer is provided as a non-tacky composition. The composition of a film having only one tacky side is referred to as a "one-sided cling" ("OSC") film, the other side (skin) being a non-clinging (i.e., "slip") composition. A film having two tacky sides (i.e., both skins are tacky) is referred to as a "double-sided cling" ("DSC") film. An industrial stretch film having at least one tacky skin layer has the advantage of being a film that can be adhered to itself during the overwrap by overlapping the film upon itself (at the overlap there will at least one cling surface, and so the films will adhere). Another advantage of cling film when the interior is the cling side is that the articles wrapped into a bundle are adhered to the film and so are prevented from shifting. Likewise, an OSC film used with the inside as the cling surface provides wrapped bundles that do not stick to each other (i.e., the cling layer is on the inside), and so loading and unloading of the wrapped bundles is facilitated because the bundles slide over each other (rather than sticking to each other). One advantage of a DSC industrial stretch film, depending upon particular shipping applications, occurs when bundles of wrapped items are stored and shipped together: the presence of a tacky exterior can act to hold the separate bundles together when they are touching, thereby preventing the articles from shifting during transportation; however, such films may tend to tear because of the adhesion of the outside cling layer.

To achieve a tacky layer, the composition can include a LLDPE that is tacky. Tackiness is related to the density (lower density is more likely to promote tackiness) and the molecular weight distribution of the polymer (a wide distribution with a number of lower molecular weight areas promotes tackiness). Resin manufacturers are well-acquainted with the tackiness characteristics of their resins and typically design and promote particular resins as specifically suitable for tacky or non-tacky skin layers in multilayer applications; refer, e.g., to Simmons, U.S. Pat. No. 5,273,809 (the disclosure of which is incorporated herein by reference) for a discussion of stretch films having cling properties and skin layers of LLDPE copolymers. Also, the method by which the resin is processed/extruded will effect the tackiness of the final film. For example, a cast film is smoother and thus typically tackier than a blown film; accordingly, tackifiers are preferably added to blown films.

In the present invention, a preferred tackifier in addition to or instead of a low density LLDPE is a polyisobutylene (PIB), low molecular weight polypropylene and other polyolefins in amount of about 1 to about 10% by weight of the layer. The tackifier can be provided in a dry or solid form, such as pellets or flakes, or as a viscous liquid that is added to a film-formable polymer blend prior to extrusion.

As noted above, various convential vapor corrosion inhibitors (VCIs) require relatively low processing temperatures, typically because the VCIs have flash points that are relatively high with respect to the extrusion temperature, often very near the extrusion temperature. Also, VCIs tend to decompose at temperatures relatively close to the extrusion temperature. Accordingly, it is desirable to include VCIs that do not adversely effect the desired properties of the tackifier. Also, it is desirable to include VCI's which are compatible with the film-formable polymers and copolymers described above. A preferred VCI is a composition that decomposes above the extrusion temperature of the film. For example, a suitable VCI is described in U.S. Pat. Nos. 5,139,700 and 5,422,187 as manufactured by Cortec Corporation including a benzotriazole. Also, suitable are VCIs manufactured by Daubert as CP2000 and a VCI for non-ferrous metals is available as METAL GUARD MPI concentrate (from Cromwell Phoenix, Inc., Chicago, Ill.). The VCI can be incorporated into any one or more layers, and preferably is present in a core layer, more preferably in a core layer adjacent to one of the skin layers, most preferably the non-tacky skin layer (often on the inside of the film, facing the wrapped article(s)).

Lubricating processing aids are beneficially added to an extruded film to prevent melt fracture and other related processing defects, as well as reducing the back pressure on the extruder and the torque required for extrusion. One preferred class of lubricants are those available under the DYNAMAR trademark (available from 3M Specialty Fluoropolymers, St. Paul, Minn.), such as grades FX-9613 and FX-5920/FX-5920A; these materials are available as free-flowing granular concentrates typically used in amounts of 250–1000 ppm for various polyalkylenes (such as LLDPE, HDPE, HMW-HDPE, LDPE, and VLDPE, as well as for EVA (ethylene vinyl acetate) and PP (polypropylene)). Lubricating processing aids typically include a fluoropolymer; a "developmental ppa concentrate" (available from 3M Center, St. Paul, Minn.) is most polyolefin (C.A.S. No. 9002-88-4) and 1–5% of 1, 1, 2, 3, 3, 3-hexafluoro-1-propene with 1, 1-difluoroethene (C.A.S. No. 9011-17-0), with minor amounts of talc, calcium carbonate, and amorphouse silica. These lubricants are useful in decreasing the temperature at which the film-formable composition can be extruded. By decreasing the extrusion temperature, these lubricants also facilitate the use of VCIs by maintaining the extrusion temperature below the flash point and degradation temperature.

As shown in the following examples, it has been unexpectedly discovered that a stretch film can be extruded with improved physical properties.

EXAMPLES

In these examples, the compounds and compositions used are shown in Table 1:

TABLE 1

| Ingredient | Compound/Composition | Supplier(s) |
|---|---|---|
| hexene-LLDPE | linear low density polyethylene hexene copolymer | Exxon; Union Carbide |
| MDPE | medium density polyethylene | Dow; Exxon |
| HDPE | high density polyethylene | Union Carbide, Equistar, Chevron |
| butene-LLDPE | linear low density polyethene butene copolymer | Quantum Chemical; Nova Chemical; Exxon; Union Carbide, Equistar, Mobil, Chevron |
| HP/LDPE | high pressure - low density polyethylene homopolymer | Exxon; Westlake |
| PIB-L | polyisobutylene liquid (CAS No. 9003-29-6) | Amoco |
| PIB-S | polyisobutylene dispersed in solid LLDPE pellet | TPM 1937 (Techmer, Rancho Domingues, CA) |
| VCI | vapor corrosion inhibitor | Daubert, Cortec, Cromwell Phoenix |

Examples 1–4

Three three-layer films having a single core, one side cling, and the other side slip (i.e., an OSC, or differential cling, film) were made from the following compositions (in which all numbers represent percentage by weight; the percentages of specific ingredients for each of layers A, B, and C are only for that layer):

TABLE 2

| | Ingredient | Ex. 1 | Ex. 2 | Ex. 3 | Ex. 4 |
|---|---|---|---|---|---|
| Layer A (16% of film weight) non-cling layer | hexene-LLDPE | 60 | 60 | 60 | 58 |
| | MDPE or HDPE | 40 | 40 | 40 | 40 |
| | lubricant | — | — | — | 2 |
| Layer B (66% of film weight) core layer | hexene-LLDPE or Octene | 56 | 60 | 60 | 59 |
| | butene-LLDPE | 30 | 32 | 32 | 30.5 |
| | VCI | 7.5 | 8 | 8 | 4.5 |
| | PIB-S/PIB-L | 6.5 (liquid) | 6.5 (liquid) | 12 (solid) | 6.5 (liquid) |
| Layer C (18% of film weight) tacky layer | hexene-LLDPE or Octene | 57.5 | 51.5 | 51.5 | 57.5 |
| | butene-LLDPE | 30.5 | 34 | 34 | 30.5 |
| | HP/LDPE | 5.5 | 6 | 6 | 5.5 |
| | PIB-S/PIB-L | 4.5 (liquid) | 8.5 (solid) | 8.5 (solid) | 4.5 (liquid) |
| | lubricant | 2 | — | — | 2 |

As shown in Table 2, the compositions for the films were essentially the same, with the film of Ex. 1 having a liquid tackifier in the tacky layer and core, Ex. 2 having a liquid in the core and a solid in the cling surface, the film of Ex. 3 having a solid in both the core and the cling side during extrusion, and the film of Ex. 4 (a one-sided cling film for blown coextrusion) having a liquid tackifier in both a skin layer and the core layer and a processing aid (lubricant) in both skin layers. The amounts shown for all are approximated as the batching process typically mixes all of the ingredients except the tackifier, and then the tackifier is added prior to extrusion. The films were made by forming separate melts for each of the compositions of layers A, B, and C as shown in Table 2. The LLDPEs are typically provided as flakes or pellets, and the tackifier (PIB) is either a liquid or a solid, pelletized mixture of PIB and an LLDPE co-polymer. The melts were blown co-extruded to form a multilayer film. The stretch film was fabricated at a blow up ratio in the range of about 1.5:1 to 3:1, more preferably in the range of 2:1 to 2.5:1, and most preferably at about 2.2:1. In all three films, layer C was a cling layer (due to the presence of polyisobutylene). The core layer B included polyisobutylene to enhance the cling properties of the skin layer. PIB has a tendency to bloom or migrate to the surface of the film; typically this surface migration takes 2 to 12 days. If greater than about 4% to 5% of a liquid PIB is used in a skin layer, then the PIB migration can actually cause the film to drip PIB as a gooey liquid at the skin layer surface, an undesirable occurrence. In this invention, it is preferred to provide some PIB in a skin layer (e.g., preferably up to about 4.5%) and to provide additional PIB in an adjacent core layer. The PIB in the core tends to stabilize the total PIB in the film while preserving the cling force of the tacky skin layer.

In Ex. 4 shown in Table 2, it is preferred to add a processing aid to both of the skin layers when a VCI or other component requiring low or lower extrusion temperatures is used in the film formulation. Although Ex. 1 and Ex. 2 are still within the scope of this invention, Ex. 4 is a more preferred embodiment. That is, it is preferred to lubricate the entire film because both skin layers will contact the die. Also, another benefit of using a lubricating processing aid is to aid in flow of the composition through the extruder. Because travel of the melt through the extruder to the die is also at lower temperatures (and thus a higher viscosity), the lubricant allows the fabricator to produce film at commercial production rates while keeping the temperature below that at which the vapor corrosion inhibitor would degrade or decompose.

Mechanical testing of each of these films gave the results shown in Table 3.

TABLE 3

| Properties | | Ex. 1 | Ex. 2 | Ex. 4 |
|---|---|---|---|---|
| Gauge (mils; approx.) | | 1.5 | 1 | 1.5 |
| Tear Strength (grams) | MD | 340 | 240 | 275 |
| | TD | 900 | 690 | 890 |
| Tensile Strength (psi) | MD | 4600 | 6000 | 4500 |
| | TD | 3500 | 4450 | 3800 |
| Tensile Yield (psi) | MD | 1400 | 1700 | 1400 |
| | TD | 1250 | 1650 | 1400 |
| Tensile Yield @ 200% Stretch | MD | 1400 | 1800 | 1400 |
| | TD | 1200 | 1500 | 1250 |
| % Elongation | MD | 550 | 500 | 550 |

TABLE 3-continued

| Properties | | Ex. 1 | Ex. 2 | Ex. 4 |
|---|---|---|---|---|
| @ Breaking (ultimate) | TD | 600 | 600 | 700 |
| % Elongation @ Yield | MD | 22 | 22 | 22 |
|  | TD | 17 | 22 | 16 |
| 2% Secant Tensile Modulus (psi) | MD | 36800 | 52750 | 38400 |
|  | TD | 39700 | 62200 | 43000 |
| Dart Drop @ 100% |  | 70 | 90 | 70 |
| Puncture Strength (lb$_f$) |  | 10 | 9 | 12 |
| HL Puncture Strength (lb$_f$) |  | 4 | 4 | 5 |
| HL Max. Stretch (%) |  | 365 | 370 | 550 |
| HL Max. Stretch Force (lb$_f$) |  | 115 | 105 | 130 |
| HL Max. Unwind Force (lb$_f$) |  | 16 | 17 | 17 |

The Dart Drop test is specified by ASTM designation D1709. The puncture strength test is performed using a conventional tensile tester (e.g., as supplied commercially by Tinius Olsen, MTS Sintech, or Thwing Albert), and using a calibrated load cell; after calibration, the film is punctured a predetermined number of times using the probe associated with the tensile tester and the force reading is taken upon each failure (puncture) of the film. The "mH" series of measurements were performed on a "HydroStretch" film development test system available from Highlight Industries, Inc. (Grandville, Mich.). The results of these HL series of tests are depicted in various figures.

Figure 1B:
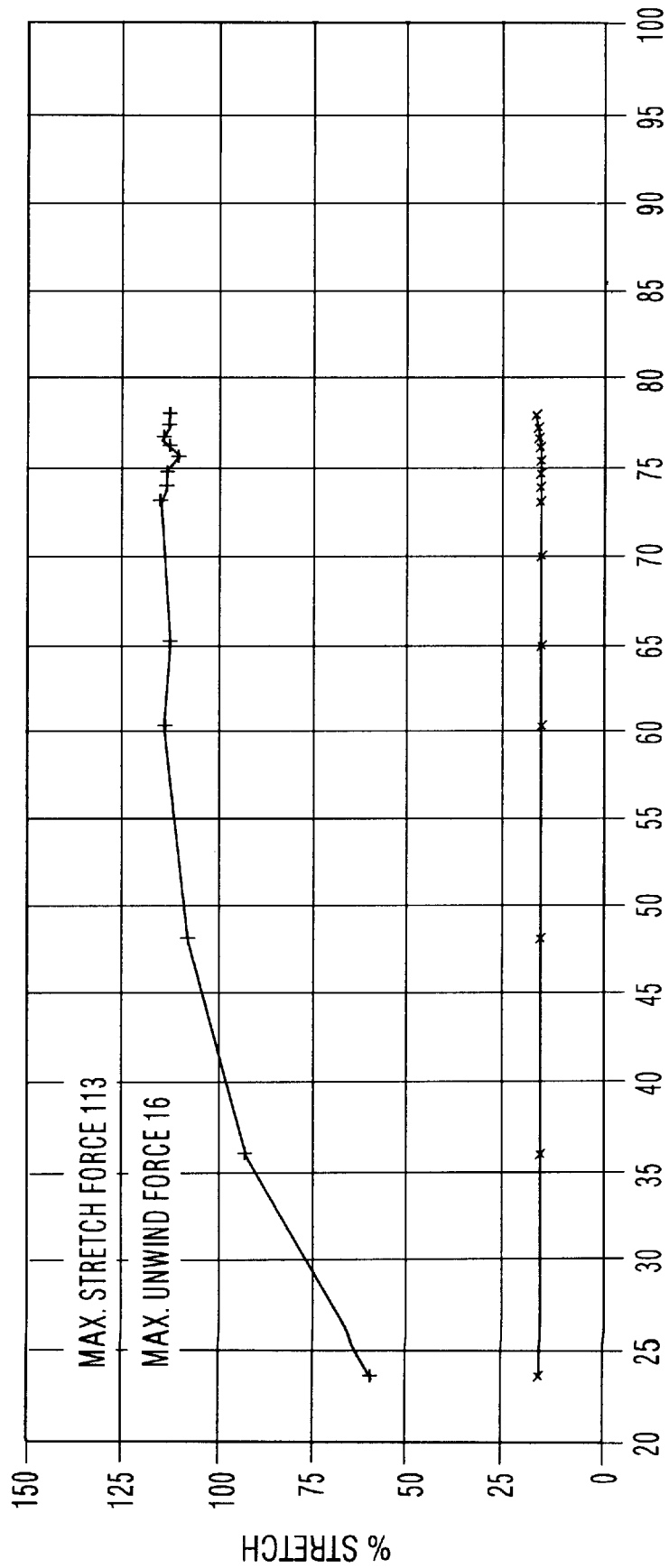

In FIGS. 1A and 1B, the film of Example 1 was tested on the HydroStretch apparatus. In FIG. 1A, the ordinate (x) represents force units (pounds force) and the abscisssa (y) represents the resulting percent of linear stretch of the sample film in response to such tensile force; as such, the percentage stretch at breaking (ultimate load) can be determined. Also as shown in FIG. 1A, the maximum percentage stretch at breaking was 363%. In FIG. 1B, the ordinate represents the same force units (pounds force) and the abscissa represents the stretch force. The top curve in FIG. 1B is related to the curve in FIG. 1A; i.e., at the breaking point, the film exerts no further force against the stretching force exerted by the testing machine. The bottom curve in FIG. 1B represents the force needed to unwind the film from a roll; because the film tested has a cling layer, this curve indicates that the force needed to unwind the film (and overcome the cling force) was about 16$_{lbf}$ (on the ordinate scale). The top curve also shows that the maximum stretch force exerted by the film was about 113$_{lbf}$.

Figure 2A:
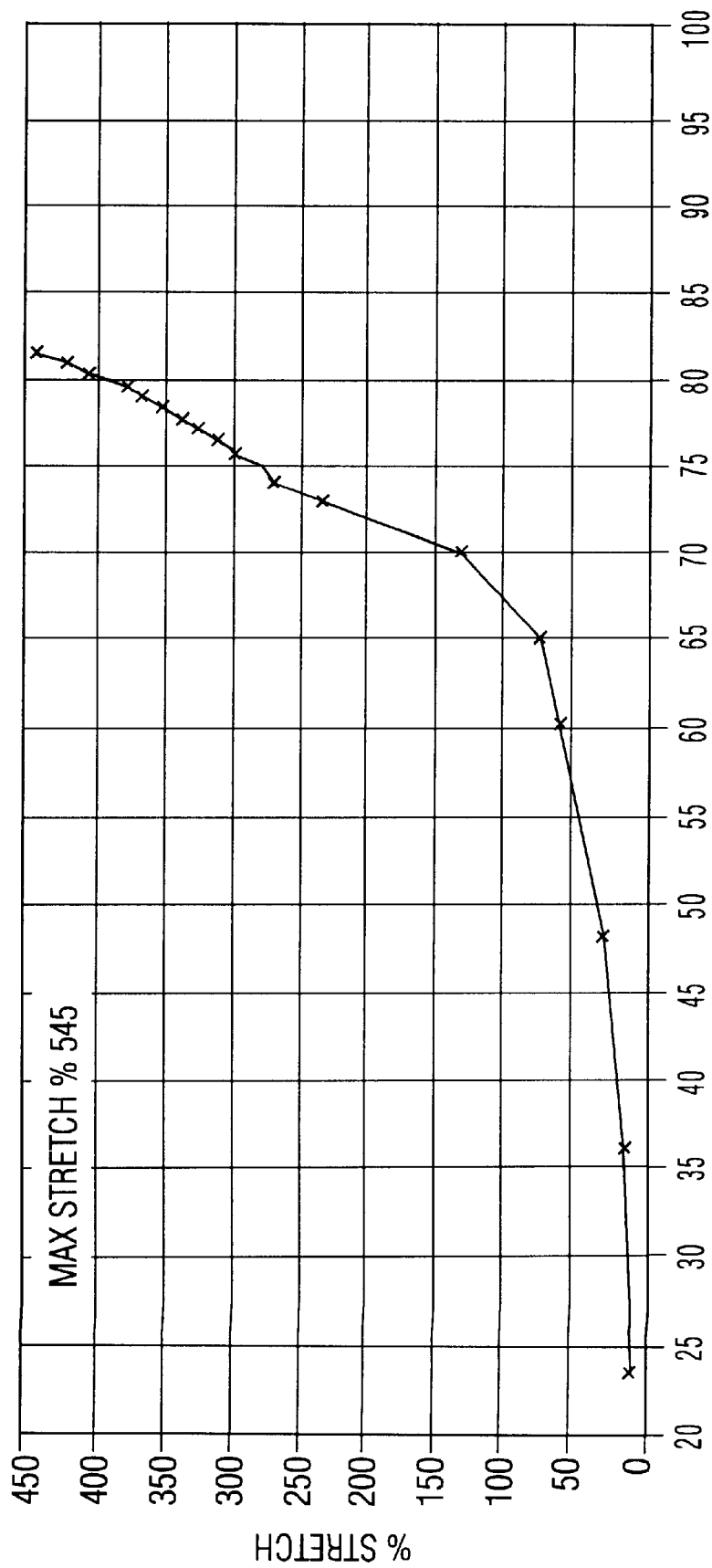
FIGS. 2A and 2B depict physical properties of novel films according to this invention.
Figure 2B:
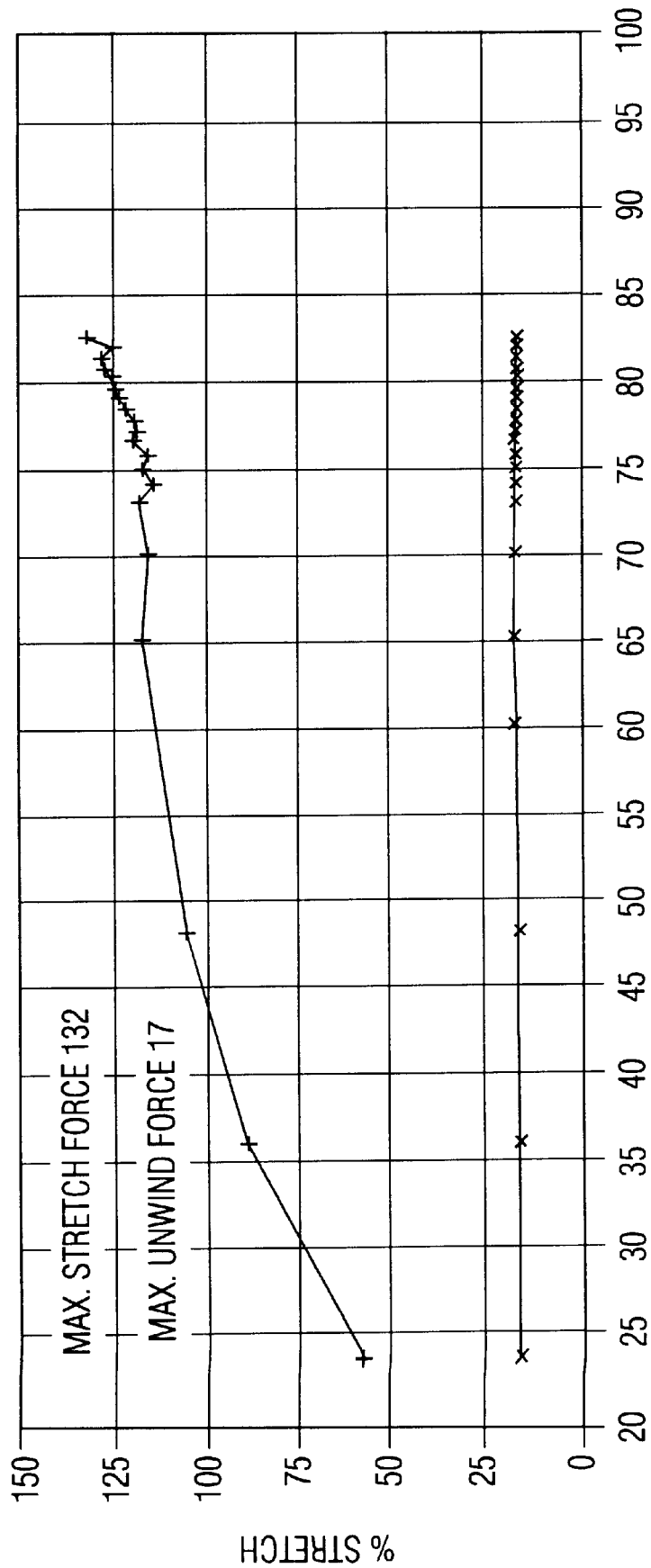

FIGS. 2A and 2B depict measurements for the film of Example 3 analogous to the results shown in FIGS. 1A and 1B for the film of Example 1. As seen in FIGS. 2A and 2B, the maximum percentage stretch at failure was about 550%, the maximum stretch force exerted by the film was about 132$_{lbf}$, and the unwind force was about 17$_{lbf}$.

Figure 3A:
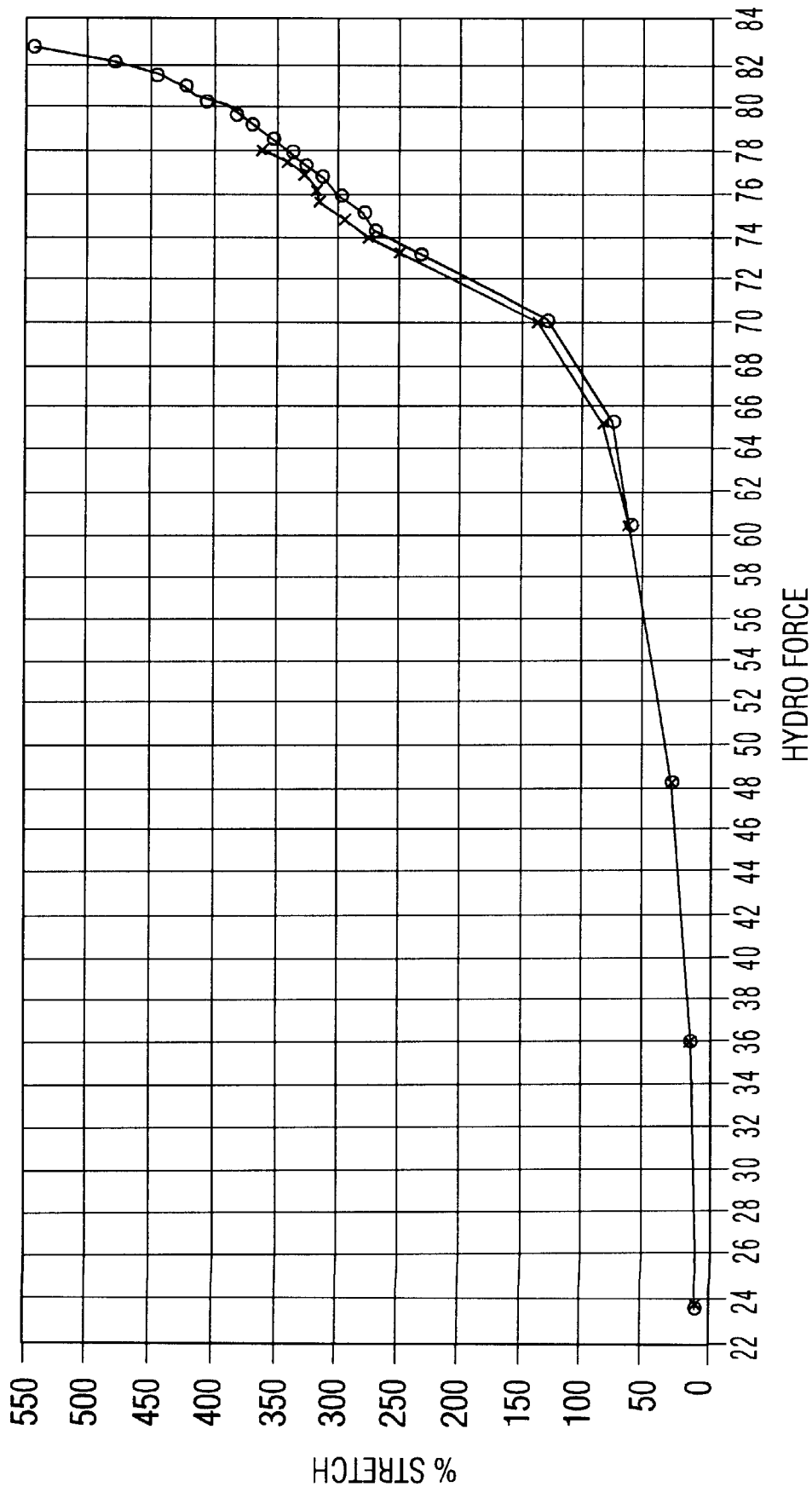
FIGS. 3A and 3B depict physical properties of a novel film according to this invention compared with another film.

FIG. 3A depicts the force (arbitrary units along ordinate scale) exerted on the film of Example 1 (x) and of Example 3 (o) versus the percent stretch of the film, analogous to FIGS. 1A and 2A. As seen in FIG. 3A, the film of Example 3 provides a stronger film (less stretch for a given force) which fails after a much greater amount of stretching and which fails under a greater load than the film of Example 1.

Figure 3B:
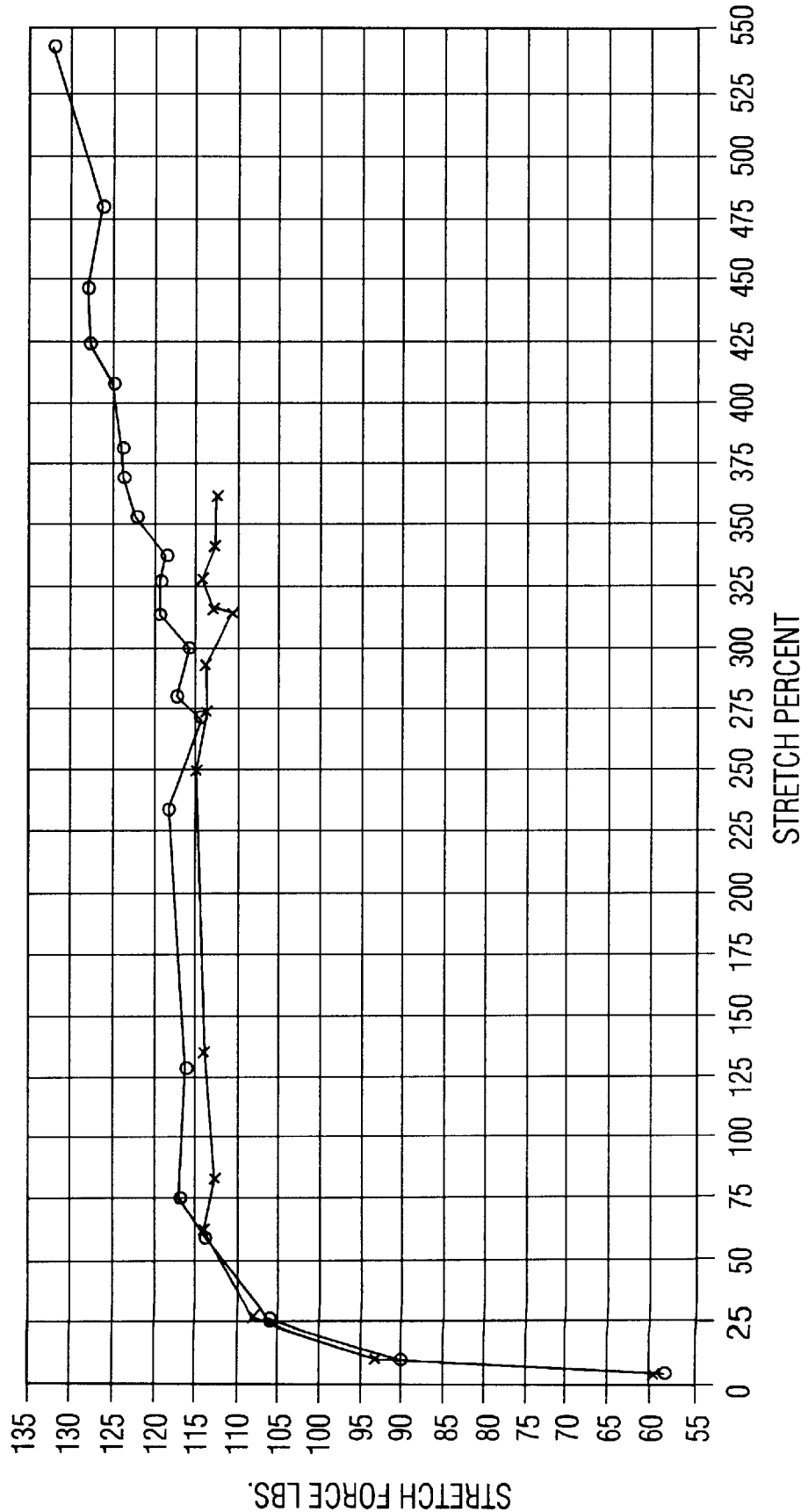

FIG. 3B depicts the percentage stretch (ordinate) of the film of Example 1 (x) and the film of Example 3 (o) versus the force (in pounds) exerted by the film at a given percentage of stretch. Again, it can be seen in this figure that the film of Example 3 provides a higher force against stretching after having been stretched by a given amount than the film of Example 1 (because the Ex. 3 curve (o) lies above the Ex. 1 curve (x)). It can also be seen in this figure that the film of Example 3 not only can be stretched much further than that of Example 1, but that the stretch force of the film of Ex. 3 continues to increase even after the film of Ex. 1 has failed at a stretch of 363%.

Comparing the results shown in Table 3, when the film of Example 1 was modified to include a solid polyisobutylene tackifier in the outer cling layer in Example 2, in an amount slightly greater than in Example 1. The physical properties of Examples 1 and 2 are comparable to each other. However, when the solid tackifier is used in both the core and the cling layers, as in Example 3, it has been found that the physical properties of the film are unexpectedly improved, especially regarding the amount by which the film can be stretched before breaking, and the contractive force exerted by the film at any given amount of stretching. This invention contemplates various combinations of tackifiers; where "L" is liquid and "S" is solid, in adjacent skin and core layers ("skin/core") the tackifier can be provided as L/L, L/S, S/L, S/S, S+L/L, S+L/S, S/S+L, and L/S+L. Any of these combinations of tackifiers can be used with a vapor corrosion inhibitor.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A coextruded multilayer stretch film comprising:
   two skin layers and at least one core layer;
   said skin layers comprise a linear low density polyethylene (LLDPE) copolymer;
   at least one of said skin layers coextruded with a tackifier; and
   said core layer comprises a linear low density polyethylene (LDPE) copolymer, said at least one of said skin layers or said core layer comprises a vapor corrosion inhibitor (VCI),
   wherein said at least one of said skin layers further comprises a lubricant extrusion temperature below the degradation temperature of said VCI.

2. The film of claim 1 wherein said copolymer of said core layer comprises a mixture of two or more compositions selected from the group consisting of LLDPE-butene, LLDPE-hexene, LLDPE-octene, low density polyethylene (LDPE), medium density polyethylene (MDPE) and high density polyethylene.

3. The film of claim 2, wherein said copolymer of said core layer comprises a mixture of LLDPE-butene and LLDPE-hexene.

4. The film of claim 1 wherein said copolymer of at least one of said skin layers comprises a mixture of two or more compositions selected from the group consisting of LLDPE-butene, LLDPE-hexene, LLDPE-octene, low density polyethylene (LDPE), medium density polyethylene (MDPE) and high density polyethylene.

5. The film of claim 4, wherein said copolymer of at least one of said skin layers comprises a mixture of LLDPE-butene and LLDPE-hexene.

6. The film of claim 5, wherein said one of said skin layers further comprises a high pressure, low density polyethylene (HP/LDPE).

7. The film of claim 5, wherein said copolymer of one of said skin layers comprises a mixture of LLDPE-hexene and low density polyethylene (LDPE), medium density polyethylene (MDPE) or high density polyethylene (HDPE).

8. The film of claim 1, wherein said vapor corrosion inhibitor (VCI) is present in said core layer.

9. The film of claim 1, wherein the film comprises at least two core layers and said VCI is present in a core layer adjacent to one of said skin layers.

10. The film of claim 9, wherein the core layer comprising the VCI and the adjacent skin layer each includes a tackifier.

11. The film of claim 1, wherein said lubricant comprises a fluoropolymer.

12. The film of claim 1, wherein said lubricant is present in both skin layers.

13. A coextruded multilayer stretch film, comprising: two skin layers and at least one core layer each layer comprised of a copolymer of ethylene and at least one higher α-olefin monomer, both of said skin layers comprising a coextruded melt derived from an admixture of a lubricant and said copolymer, and wherein said core layer is adjacent to at least one of said skin layers and at least one of skin layers or said core layer further comprises a vapor corrosion inhibitor.

14. The film of claim 13, wherein at least one of said skin layers further comprises a tackifier.

15. The film of claim 13, wherein said copolymer of at least one of said skin and core layers comprises a linear low density polyethylene (LLDPE) copolymer.

16. The film of claim 13 wherein said copolymer of said core layer comprises a mixture of two or more compositions selected from the group consisting of LLDPE-butene, LLDPE-hexene, LLDPE-octene, low density polyethylene (LDPE), medium density polyethylene (MDPE) and high density polyethylene.

17. The film of claim 16, wherein said copolymer of said core layer comprises a mixture of LLDPE-butene and LLDPE-hexene.

18. The film of claim 13 wherein said copolymer of at least one of said skin layers comprises a mixture of two or more compositions selected from the group consisting of LLDPE-butene, LLDPE-hexene, LLDPE-octene, low density polyethylene (LDPE), medium density polyethylene (MDPE) and high density polyethylene.

19. The film of claim 18, wherein said copolymer of at least one of said skin layers comprises a mitre of LLDPE-butene and LLDPE-hexene.

20. The film of claim 19, wherein said one of said skin layers further comprises a high pressure, low density polyethylene (HP/LDPE) in admixture with said copolymer.

21. The film of claim 18, wherein said copolymer of one of skin layers comprises a mixture of LLDPE-hexene and medium density polyethylene (MDPE) or high density polyethylene (HDPE).

22. The film of claim 14, wherein said core layer adjacent to said skin layer comprising said tackifier further comprises a tackifier.

23. The film of claim 13, wherein said lubricant comprises a fluoropolymer.

24. The film of claim 13, wherein said lubricant is present in both skin layers.

25. The film of claim 13, wherein said film is a blown film.

26. The film of claim 13, wherein said film is a cast film.

27. The film of claim 14, wherein said tackifier is in the form of a solid, a liquid, or a mixture thereof.

28. The film of claim 13, wherein both of said skin layers contain further comprise a vapor corrosion inhibitor.

29. An article of manufacture wrapped in the film of claim 1.

30. The wrapped article of claim 29, wherein said article is subject to corrosion.

31. An article of manufacture wrapped in the film of claim 13.

32. The wrapped article of claim 31, wherein said article is subject to corrosion.

33. A multilayer stretch film, comprising:

two skin layers coextruded with at least one core layer, each layer comprised of a polymeric material selected from the group of: a polymer of ethylene, a copolymer of ethylene and at least one higher α-olefin monomer, a propylene homopolymer and a copolymer of propylene with at least one higher α-olefin monomer and wherein said core layer is adjacent to at least one of said skin layers and said skin or said core layer further comprises a vapor corrosion inhibitor.

34. The stretch film of claim 33 wherein said VCI comprises a benzotriazole.

35. The stretch film of claim 33 wherein said VCI is present in said core layer.

36. The stretch film of claim 33 wherein at least one of said skin layers further comprises a tackifier.

37. The stretch film of claim 36 wherein at least one of said skin layers other than said skin layer comprising said tackifier comprises said VCI.

38. A multilayer stretch film, comprising:

two skin layers coextruded with at least one core layer, each layer comprised of a polymeric material selected from the group of a polymer of ethylene, a copolymer of ethylene and at least one higher α-olefin momnomer, a propylene homopolymer and a copolymer of propylene with at least one higher α-olefin momnomer;

wherein said core layer is adjacent to at least one of said skin layers and said skin layer or said core layer further comprises a vapor corrosion inhibitor (VCI);

and wherein said VCI decomposes only above the extrusion temperature of said stretch film.

* * * * *